United States Patent Office.

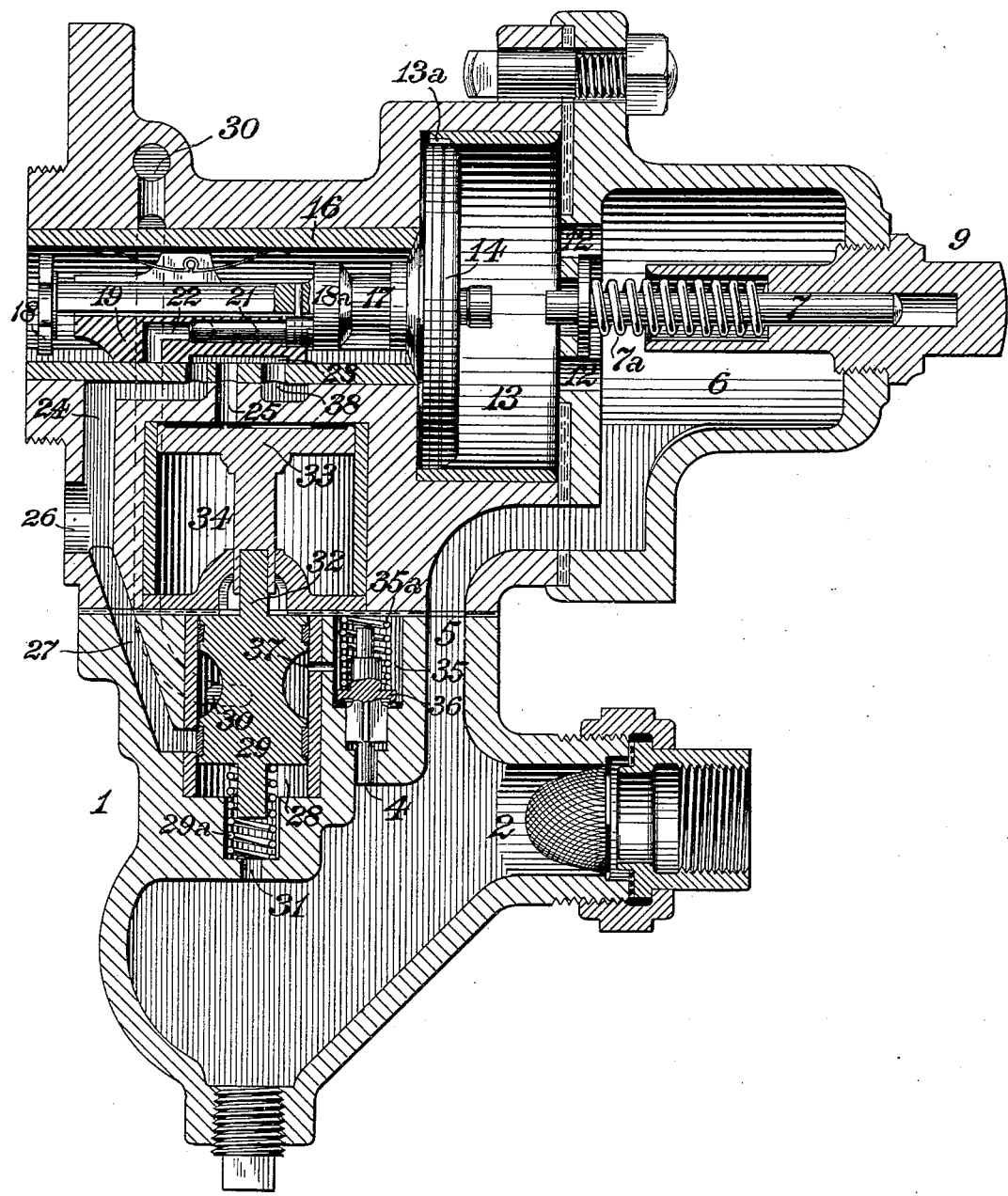

BRYANT BEASLEY, OF SAVANNAH, GEORGIA.

TRIPLE VALVE.

SPECIFICATION forming part of Letters Patent No. 620,691, dated March 7, 1899.

Application filed June 9, 1897. Serial No. 640,069. (No model.)

*To all whom it may concern:*

Be it known that I, BRYANT BEASLEY, of Savannah, in the county of Chatham and State of Georgia, have invented a certain new and useful Improvement in Triple Valves for Air-Brakes, of which improvement the following is a specification.

My invention relates to triple valves for automatic air-brake apparatus; and its object is to provide a mechanism of this general class in the operation of which the brakes may be applied with greater force than heretofore whenever an emergency application is necessary, irrespective of the proximity of a previous service application or applications of lesser force or during and before releasing an ordinary service or graduated application, full braking-pressure being at all times reserved for emergency purposes.

The improvement claimed is hereinafter fully set forth.

In the use of triple valves of the types employed in automatic air-brake apparatus prior to my invention and with a pressure of seventy pounds in the train-line and auxiliary reservoir the maximum braking pressure in an emergency application—say sixty pounds to the square inch—can only be obtained in the brake-cylinder upon the first reduction of train-pipe pressure which is made for that purpose after the train-line and reservoirs have been charged to maximum pressure, or, in other words, cannot be made after the making of a service application until the brakes have been released and the auxiliary reservoirs have been recharged to the maximum train-pipe pressure. If an emergency application is required in close succession to a full service application of fifty pounds, a brake-cylinder pressure of only about thirty-five pounds can be obtained, as there has not been sufficient time to recharge the auxiliary reservoirs to maximum pressure. Therefore if the brakes have been applied to control or reduce the speed of a heavy train and upon their release impending accident renders an emergency application necessary it may be impossible to prevent collision or derailment by reason of there being a pressure of only about thirty-five pounds obtainable in the brake-cylinders.

The triple valve of my present invention is designed for use with two independent auxiliary reservoirs, one of which supplies air under pressure for service applications and the other for emergency or maximum-force applications exclusively. In the operation of my invention if a service application has been made by air from the service auxiliary reservoir in order to bring the train under control and upon the release of the brakes a train or obstruction upon the track or any other condition of danger renders it necessary to apply the brakes with the greatest available force an emergency application may be made by air from the emergency auxiliary reservoir and a pressure of from fifty to fifty-two pounds be obtained in the brake-cylinder, while, as before stated, only about thirty-five pounds would be available under similar conditions with triple valves of ordinary types. A further advantage in practice is attained by the capability of gradually applying the maximum braking pressure by successive applications of air from the service auxiliary reservoir preliminary to an emergency application, thereby avoiding liability to breakage of foundation brakes and connections and inconvenience and possible injury to passengers due to the sudden application of the brakes with maximum force.

The accompanying drawing is a vertical central section through a triple valve, illustrating an embodiment of my invention.

The triple valve herein set forth accords in all essential particulars other than those of my invention with the standard Westinghouse type; but my invention is not limited in application to that or any other specific form of triple valve. The shell or casing 1 of the valve mechanism is, as heretofore, provided with a passage 2 for connection to the train-pipe, a passage 26 for connection to the brake-cylinder, and a valve-bushing 16, the outer end of which is connected to a service auxiliary reservoir. It is also provided with a port or passage 30, the outer end of which is connected with an independent emergency auxiliary reservoir, which is not shown. A passage 5 connects the train-pipe passage 2 with the drain-cup 6, which in turn communicates through passages 12 with the piston-chamber 13, at the inner end of which is formed the usual leakage-groove 13ª. The main piston 14, which is fitted to traverse in the chamber 13, abuts at the extremity of its outward traverse in service applications against a graduating-stem 7, which is held to a bearing against the inner end of the drain-cup by a graduating-spring 7ª. The main valve 19 is fitted with a limited degree of lost motion between collars 18 18ª on the piston-stem 17 and is provided with a graduating-port 22 which is controlled by a graduating-valve 21 and in service applications of the brake communicates with a port 24, leading to the brake-cylinder passage 26. The main valve 19 has the usual exhaust recess or cavity 23 and controls a port 25, leading from its seat in the valve-bushing to an emergency-piston chamber 34 and an exhaust-port 38, leading to the atmosphere. An emergency-piston 33 is fitted to traverse in the chamber 34 and abuts by a central stem upon the stem 32 of a double-headed piston-valve 29, which controls communication between the emergency auxiliary reservoir and the brake-cylinder passage 26, and is fitted to traverse in a chamber 28, below and in line axially with the chamber 34. The piston-valve 29 and emergency-piston 33 are normally held at the upper limit of their traverse by a spring 29ª, bearing on the piston-valve 29, and by the action of train-pipe pressure on the lower end of said valve. The chamber 28 of the piston-valve 29 communicates below said valve with the train-pipe passage 2 by a port 31, and also communicates by a port 37, above the lower head of said valve, with a chamber 35, which in turn communicates with the train-pipe passage 2 by a port 4, controlled by a check-valve 36, which is normally held to its seat by a spring 35ª.

It will be seen that otherwise than as to the emergency device my present invention does not involve any difference, either structural or operative, from the standard Westinghouse triple valve, and, except as to the location for convenience of a portion of the port or passage 30 in the upper section of the valve-casing and the extension therein of the port 27 to the brake-cylinder connection 26, the elements of my invention which are additional to those of the standard type are wholly contained in the lower or train-pipe section of the valve-casing.

In operation air supplied to the train-pipe from the main reservoir on the engine enters the passage 2, and passing through the passage 5, drain-cup 6, and passages 12 enters the piston-chamber 13, forcing the piston 14 to the inner limit of its traverse and passing through the leakage-groove 13ª and valve-bushing 16 to the service auxiliary reservoir connected therewith, which it charges to the normal train-pipe pressure of, say, seventy pounds. When the main piston 14 is in this so-called "release" position, the exhaust-recess 23 of the main valve 19 establishes communication between the brake-cylinder passage 26 and port 24 and the exhaust-port 38, and there is consequently open communication between the brake-cylinder and the atmosphere. Train-pipe air coincidently passes through the port 4, and unseating the check-valve 36 passes through the chamber 35 of said valve, the port 37, the chamber 28 of the piston-valve 29, and the port 30 into the emergency auxiliary reservoir, which it charges to normal train-pipe pressure, upon which the check-valve 36 is reseated by its spring 35ª.

To effect a service application of the brakes in order to reduce the speed of or gradually stop the train, as the case may be, a slight reduction of train-pipe pressure is made by the engineer, whereupon the then higher pressure in the service auxiliary reservoir moves the main piston 14 outwardly until its stem abuts against the graduating-stem 7, which arrests its further progress. The main valve 19 is by this movement of the piston brought into such position that its graduating-port 22 registers with the port 24, leading to the brake-cylinder passage 26, and air from the service auxiliary reservoir passes into the brake-cylinder and continues to flow thereinto until the pressure in the service auxiliary reservoir equalizes with or becomes slightly less than that in the train-pipe, when the piston 14 is moved by the train-pipe pressure sufficiently inwardly to bring the graduating-valve 21 to its seat, thereby cutting off the further flow of air to the brake-cylinder and causing the brake-shoes to be held against the wheels with the limited pressure due to the volume of air admitted thereinto. This operation may be repeated, as desired, until a reduction of about twenty pounds has been made in the train-pipe, when the pressures in the brake-cylinder, service auxiliary reservoir, and train-pipe will equalize at fifty pounds and a full service application of the brakes will be made. To release the brakes, air is admitted to the train-pipe from the main reservoir on the engine, when the piston 14 will be moved to release position, as shown in the drawing, and the air will be exhausted from the brake-cylinder, the spring of the brake-cylinder piston at the same time withdrawing the brake-shoes from contact with the wheels. During all service applications no communication is opened between the emergency auxiliary reservoir and the brake-cylinder, and the pressure stored in said reservoir therefore remains at the maximum of seventy pounds, to which it was originally charged.

When for any reason, as in an emergency requiring the stoppage of the train in the shortest possible time and distance, it is desired to effect an immediate application of the brakes with maximum force, a sudden reduction of pressure—say eight or ten pounds—is made in the train-pipe by the engineer, whereupon the main piston 14 is moved by the pressure in the service auxiliary reservoir to the limit of its outward traverse, compressing the graduating-spring 7ᵃ and moving the main valve 19 until it uncovers the brake-cylinder port 24 and the port 25, leading into the chamber of the emergency-piston 33. Pressure from the service auxiliary reservoir thereupon forces the emergency-piston 33 downwardly, said piston imparting corresponding movement to the valve 29, which opens communication between the port 30, leading to the emergency auxiliary reservoir, and the port 27, leading to the brake-cylinder, and air of maximum pressure is thereby admitted from said reservoir to the brake-cylinder, as well as air from the service auxiliary reservoir, which enters through the port 24, these pressures equalizing with that in the train-pipe and aggregating the maximum emergency pressure of sixty pounds in the brake-cylinder if the application be the first which is made after both auxiliary reservoirs have been charged to maximum pressure. If the train-pipe pressure and the pressure in the service auxiliary reservoir have been reduced by a previous service application which has not yet been released and have not been reinstated to maximum pressure, the maximum emergency pressure is obtainable; but if the train-pipe pressure and service auxiliary reservoir have been reduced by a service application which has been released and have not been reinstated to maximum pressure then, as before stated, a higher emergency pressure may be obtained in the brake-cylinder under such conditions than with the present constructions, from fifty to fifty-two pounds being available, as compared with about thirty-five in ordinary practice.

The release of the brakes and the recharging of the service and emergency auxiliary reservoirs after an emergency application of the brakes are effected in the same manner as after a service application.

The leading and essential characteristic of my invention consists in the provision of an emergency mechanism applicable to triple valves of any of the present types which is inactive in service applications and permits the same to be made in the ordinary manner and by which in emergencies the maximum pressure of a supplemental or emergency auxiliary reservoir may be charged into the brake-cylinder under any and all circumstances, there being no reduction thereof by expansion into a main auxiliary reservoir or interference with delivery by coincident delivery of train-pipe pressure.

I claim as my invention and desire to secure by Letters Patent—

1. In an automatic fluid-pressure brake apparatus, the combination, substantially as set forth, of a valve casing or chest having independent supply connections to a train-pipe, a service auxiliary reservoir, an emergency auxiliary reservoir, and a brake-cylinder, a main piston and valve adapted to effect service applications of the brakes by air from the service auxiliary reservoir, without releasing air from the emergency auxiliary reservoir, and an emergency piston and valve adapted to effect the supply of air exclusively from the emergency auxiliary reservoir to the brake-cylinder connection, in emergency applications, without permitting interference with such supply by access of air from the train-pipe connection.

2. In an automatic fluid-pressure brake apparatus, the combination, substantially as set forth, of a valve casing or chest having independent supply connections to a train-pipe, a service auxiliary reservoir, an emergency auxiliary reservoir, and a brake-cylinder, a port or passage in the casing leading from the emergency-auxiliary-reservoir connection to the brake-cylinder connection, which port is the only discharge avenue from the emergency auxiliary reservoir, and is adapted to deliver air exclusively therefrom to the brake-cylinder without the access of air from the train-pipe connection, an emergency-valve controlling said port, an emergency-piston actuated by pressure from the service auxiliary reservoir and fitted to impart movement to said valve, a main piston, and a main valve actuated by the main piston and controlling communication between the service auxiliary reservoir and the brake-cylinder connection.

3. In an automatic fluid-pressure brake apparatus, the combination, substantially as set forth, of a valve casing or chest having connections to a train-pipe, a service auxiliary reservoir, an emergency auxiliary reservoir, and a brake-cylinder, a port or passage in the casing leading from the emergency-auxiliary-reservoir connection to the brake-cylinder connection and adapted to deliver air from the former to the latter without the access of air from the train-pipe connection, an emergency-valve controlling said port and adapted to intercept communication during delivery therefrom, between the train-pipe connection and said port, an emergency-piston actuated by pressure from the service auxiliary reservoir and fitted to impart movement to said valve, a main piston, and a main valve actuated by the main piston and controlling communication between the service auxiliary reservoir and the brake-cylinder connection.

4. In an automatic fluid-pressure brake apparatus, the combination, substantially as set forth, of a valve casing or chest having connections to a train-pipe, a service auxiliary reservoir, an emergency auxiliary reservoir, and a brake-cylinder, a port or passage in the casing leading from the emergency-auxiliary-reservoir connection to an emergency-valve chamber, a check-valved charging-passage leading from the train-pipe connection to said chamber, a passage from said chamber to the brake-cylinder connection, an emergency-valve working in said chamber and controlling communication between the charging-passage and the emergency-auxiliary-reservoir port, and between the emergency-auxiliary-reservoir port and the brake-cylinder-connection passage, respectively, an emergency-piston actuated by pressure from the service auxiliary reservoir and fitted to impart movement to the emergency-valve, a main piston, and a main valve actuated by the main piston and controlling communication between the service auxiliary reservoir and the brake-cylinder connection.

5. The combination, substantially as set forth, of a mechanism for performing the functions of a plain or standard triple valve, means for charging an emergency auxiliary reservoir from the train-pipe connection thereof, independently of an ordinary or service reservoir, and means for effecting the supply of air exclusively from an emergency auxiliary reservoir to the brake-cylinder connection of the triple valve, in emergency applications, without access of air from the train-pipe connection.

In testimony whereof I have signed this specification in the presence of two subscribing witnesses.

BRYANT BEASLEY.

Witnesses:
C. R. RICHARDS,
G. T. RYLE.